United States Patent
Hsu et al.

(10) Patent No.: US 7,460,461 B2
(45) Date of Patent: Dec. 2, 2008

(54) OPTICAL STORAGE SYSTEM HAVING INTEGRATED LASER DRIVER SIGNAL PROCESSOR

(75) Inventors: Chih-Chin Hsu, Taipei County (TW); Chih-Yuan Chen, Changhua County (TW); Ying-Che Hung, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 11/834,694

(22) Filed: Aug. 7, 2007

(65) Prior Publication Data

US 2007/0268803 A1    Nov. 22, 2007

Related U.S. Application Data

(62) Division of application No. 10/904,287, filed on Nov. 2, 2004.

(51) Int. Cl.
G11B 7/00 (2006.01)
(52) U.S. Cl. ...................................................... 369/116
(58) Field of Classification Search ................. 369/116, 369/120, 121, 47.1, 47.5, 47.51, 124.01, 369/124.12, 53.35, 53.21, 275.2, 124.06, 369/59.25, 122
See application file for complete search history.

(56) References Cited

U.S. PATENT DOCUMENTS

| | | | |
|---|---|---|---|
| 5,270,877 A * | 12/1993 | Fukushima et al. ........... 360/48 |
| 5,859,862 A | 1/1999 | Hikasa | |
| 6,414,932 B1 | 7/2002 | Kaku | |
| 6,483,791 B1 | 11/2002 | Asada | |
| 6,487,154 B1 | 11/2002 | Kurebayashi | |
| 6,552,987 B1 | 4/2003 | Asada | |
| 6,990,056 B2 | 1/2006 | Mashimo | |
| 7,200,091 B2 | 4/2007 | Masui | |
| 7,263,056 B2 * | 8/2007 | Allen ....................... 369/275.2 |
| 2002/0186628 A1 | 12/2002 | Hoshino | |
| 2004/0120369 A1 | 6/2004 | Fairgrieve | |
| 2004/0136286 A1 | 7/2004 | Nishimura | |
| 2004/0136298 A1 | 7/2004 | Ichikawa | |

FOREIGN PATENT DOCUMENTS

CN          1505009 A       6/2004

* cited by examiner

Primary Examiner—Nabil Hindi
(74) Attorney, Agent, or Firm—Winston Hsu

(57) ABSTRACT

An optical storage system includes an optical pickup unit movable across an optical medium. The optical pickup unit has a light detector, a laser diode, and a laser driver signal processor circuit. The laser driver signal processor circuit includes a detected signal processing block for outputting read signals corresponding to light received at the light detector, and a read signal processing block for processing the read signals and generating control signals or synthesis signals according to the read signals. A control unit is coupled to the optical pickup unit for controlling the optical pickup unit and decoding data recovered from the optical medium. The optical storage system further includes encryption and decryption modules or error detection modules for securing commands and information sent between the control unit and the laser driver signal processor circuit against reverse engineering.

4 Claims, 9 Drawing Sheets

OPTICAL STORAGE SYSTEM HAVING INTEGRATED LASER DRIVER SIGNAL PROCESSOR

CROSS REFERENCE TO RELATED APPLICATIONS

This divisional application claims the benefit of co-pending U.S. patent application Ser. No. 10/904,287, filed on Nov. 2, 2004 and included herein by reference.

BACKGROUND

The invention relates to optical storage systems, and more particularly, to an integrated laser driver signal processor circuit installed in an optical pickup unit of an optical storage system.

In the field of products related to optical discs, such as compact discs (CDs), digital versatile/video discs (DVDs) and the like, an increase in capacity of the optical disc and an increase in speed of data transfer of the optical disc storage system are continuously being desired. Also, as the capacity of optical discs is increased, mark and space (corresponding to information of 1 and 0) to be formed on the optical disc by the optical disc apparatus are required to be finer and more accurate.

In order to form accurate and fine mark and space, a mark recording waveform is required to have a multi-pulse form to be used as a drive current waveform for a semiconductor laser during recording. A pulse position or pulse width at the mark start and a pulse position or pulse width at the mark termination must be adaptively controlled in accordance with a mark length and an adjoining space length. For example, according to the DVD-RAM specification, the aforementioned adaptive control of the pulse position or pulse width is required to be performed in T/16 to T/32 steps (T being a minimum unit for determining the mark and space lengths and corresponding to the period of the so-called channel clock chCLK).

Furthermore, in contrast to the conventional binary format, the drive current waveform is also needed to be in a quaternary form and is therefore more complicated. As the data transfer speed is increased, the frequency of the aforementioned drive current waveform becomes higher.

Because the capacity and data transfer speeds are increased in this manner, current at multiple-valued levels supplied to the semiconductor laser must be switched at a high speed. To ensure such a high-speed current switching characteristic (rise characteristic: Tr, and fall characteristic: Tf of the drive current), it is preferable that the semiconductor laser drive circuit be disposed in the proximity of the semiconductor laser.

To meet this requirement, a conventional semiconductor laser drive circuit is so constructed as to have a plurality of current sources at least one of which is externally selected to drive the semiconductor laser. Therefore, as the drive current waveform has multiple valued levels, the number of control signal lines for selecting the current source increases. When the semiconductor laser drive circuit is carried on an optical pickup, signals are supplied to the optical pickup and received from the optical pickup through a flexible cable. However, as the capacity and speed of the optical disc increases, the level of the reproduction signal for reading information from the recording medium decreases and a difficulty arises that because of degradation of the control signal waveforms and the difference (skew) in delay amounts between control signals, the accurate drive current waveform cannot be obtained. For the sake of assuring reliable reproduction of data, sources of signal degradation such as cross-talk from the recording circuit system to the reproduction circuit system must be further decreased. The optical pickup carries photo detectors for detecting a reflection light beam from the optical disc and I-V amplifiers for converting output currents of the photo detectors to voltages, and outputs of the amplifiers are supplied to a decoder through the flexible cable.

For example, FIG. 1 shows a block diagram of an optical drive 100 according to the related art. The optical drive 100 includes a control unit 102 and an optical pickup unit 104 connected by a flexible cable 106. As shown in FIG. 1, the control unit 102 includes a controller such as a digital signal processor (DSP) 108, an encoder unit 110, a record phase lock loop (PLL) 112, a write strategy timing generator 114, an automatic power control (APC) circuit 116, a decoder unit 118, a receive PLL 120, and an RF signal processor 122 including a wobble processor 124. The optical pickup unit 104 includes a first laser diode LD1, a second laser diode LD2, a front monitor diode (FMD), a photo detector integrated circuit PDIC 126, a current to voltage converter 128, and a laser current driver generator 130. The optical pickup unit moves across an optical medium 132 and is connected to the control unit 102 via a flexible cable 106. To allow the optical pickup to move while maintaining electrical connectivity, all control signals of the laser current driver generator 130 and all electrical signals corresponding to the light received by the laser diodes LD1, LD2 and the front monitor diode FMD are coupled to the control unit 102 using the flexible cable 106. Accordingly, at high speeds, the influence of cross-talk and other distortion sources on the flexible cable 106 on the signals transmitted to the control unit 102 or to the optical pickup unit 104 must be reduced to prevent degradation of the reproduction signal to noise radio S/N.

SUMMARY

One objective of the claimed invention is therefore to provide a laser driver circuit being installed on a movable optical pickup unit of an optical storage system, and being capable of processing signals read from an optical medium to solve the above-mentioned problems.

According to one exemplary embodiment of the present invention, an optical storage system is provided. The optical storage system includes: an optical pickup unit movable across an optical medium, the optical pickup unit comprising a light detector, a laser diode, and a laser driver signal processor circuit; and a control unit being coupled to the optical pickup unit. The laser driver signal processor circuit comprises: a detected signal processing block for outputting read signals corresponding to light received at the light detector; and a read signal processing block for processing the read signals and generating control signals or synthesis signals according to the read signals. The control unit is for controlling the optical pickup unit and decoding data recovered from the optical medium. The laser driver signal processor circuit further comprises an interface circuit coupled to the control unit; the interface circuit has a plurality of control registers for receiving commands from the control unit and for configuring the laser driver signal processor circuit according to the received commands; and the interface circuit and the control unit further comprise encryption and decryption modules for encrypting the commands and information sent between the control unit and the laser driver signal processor circuit through the interface circuit.

According to another exemplary embodiment of the present invention, an optical storage system includes: an optical pickup unit movable across an optical medium, the optical pickup unit comprising a light detector, a laser diode, and a laser driver signal processor circuit; and a control unit being coupled to the optical pickup unit. The laser driver signal processor circuit comprises: a detected signal processing block for outputting read signals corresponding to light received at the light detector; and a read signal processing block for processing the read signals and generating control signals or synthesis signals according to the read signals. The control unit is for controlling the optical pickup unit and decoding data recovered from the optical medium. The laser driver signal processor circuit further comprises an interface circuit coupled to the control unit; the interface circuit has a plurality of control registers for receiving commands from the control unit and for configuring the laser driver signal processor circuit according to the received commands; and the interface circuit and the control unit further comprise error detection modules for detecting errors or correcting errors in the commands or information sent between the control unit and the laser driver signal processor circuit through the interface circuit.

According to yet another exemplary embodiment of the present invention, a laser driver signal processor circuit installed in a movable optical pickup unit of an optical storage device is provided. The laser driver signal processor circuit includes: a detected signal processing block for outputting read signals corresponding to light received at the light detector; a read signal processing block for processing the read signals and generating control signals or synthesis signals according to the read signals; and an interface circuit coupled to a control unit. The interface circuit comprises: a plurality of control registers for receiving commands from the control unit and for configuring the laser driver signal processor circuit according to the received commands; and an encryption and decryption module, for encrypting the commands and other information sent between the control unit and the laser driver signal processor circuit through the interface circuit.

According to further another exemplary embodiment of the present invention, a laser driver signal processor circuit installed in a movable optical pickup unit of an optical storage device is provided. The laser driver signal processor circuit includes: a detected signal processing block for outputting read signals corresponding to light received at the light detector; a read signal processing block for processing the read signals and generating control signals or synthesis signals according to the read signals; and an interface circuit coupled to a control unit. The interface circuit comprises: a plurality of control registers for receiving commands from the control unit and for configuring the laser driver signal processor circuit according to the received commands; and an error detection module for detecting errors in the commands or other information sent between the control unit and the laser driver signal processor circuit through the interface circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
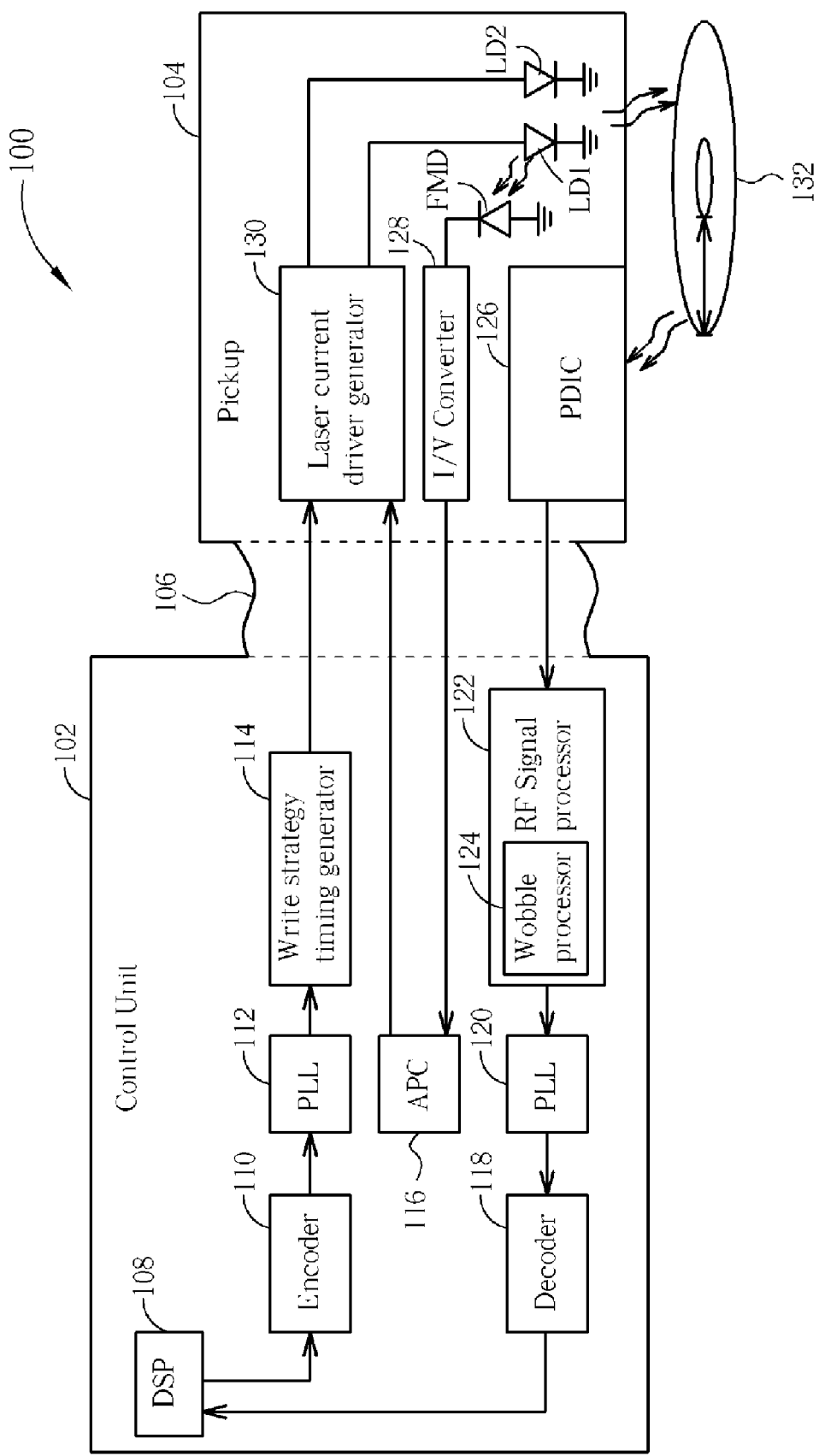
FIG. 1 is a block diagram of an optical drive according to the related art.
Figure 2:
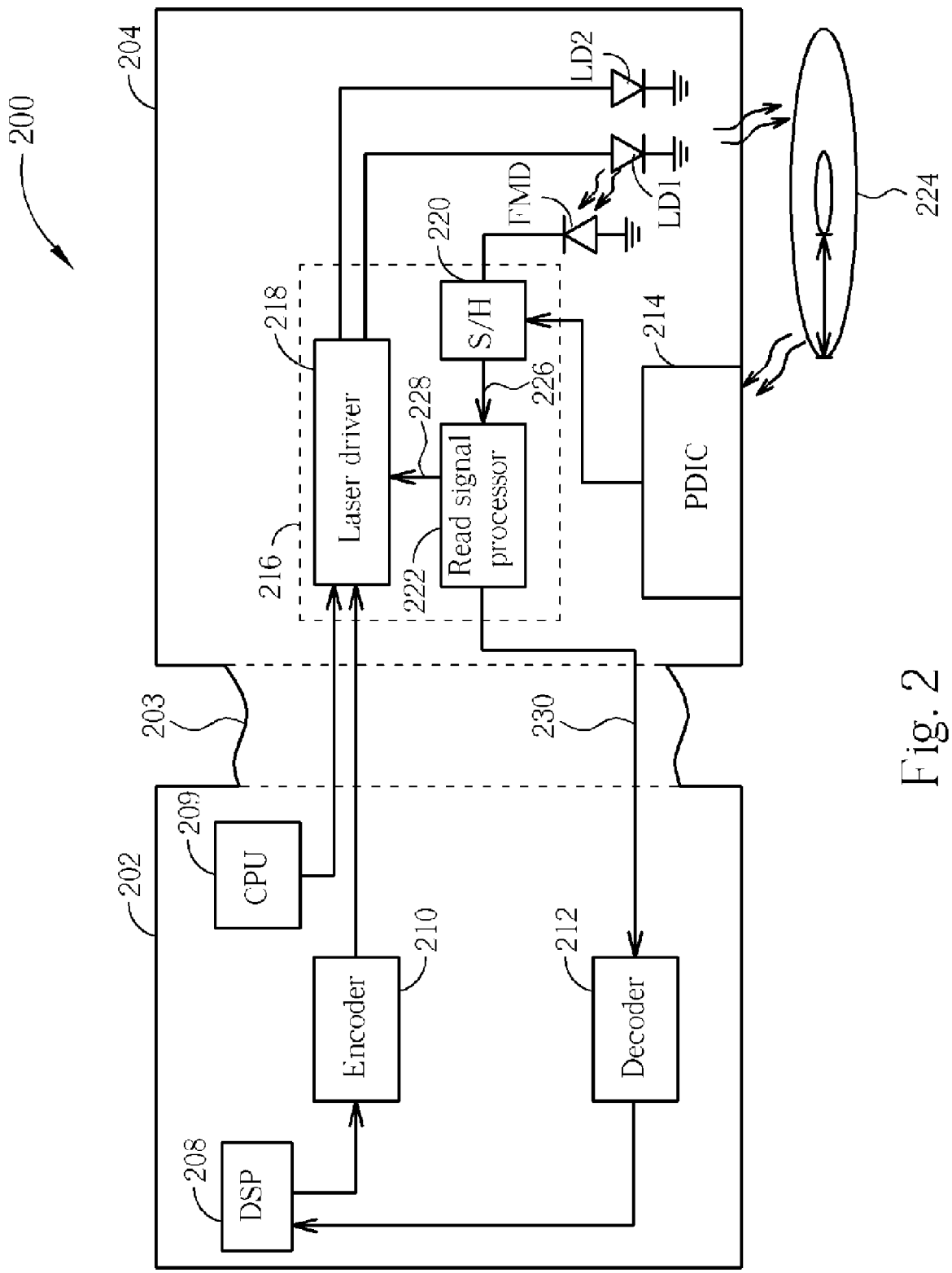
FIG. 2 is an overall block diagram of an optical storage system according to one embodiment of the present invention.

FIG. 2 shows an overall block diagram of an optical storage system 200 according to one embodiment of the present invention. The optical storage system 200 includes a control unit 202 and an optical pickup unit 204. As shown in FIG. 2, the control unit 202 includes a controller such as a digital signal processor 208, an encoder unit 210, and a decoder unit 212. The optical pickup unit 204 includes a first laser diode LD1, a second laser diode LD2, a front monitor diode (FMD), a photo detector integrated circuit (PDIC) 214, and a laser driver signal processor circuit 216. The laser driver signal processor circuit 214 includes a laser driver 218, a detected signal processing block 220, and a read signal processing block 222. The optical pickup unit 204 is movable across an optical medium 224 and is connected to the control unit 202 via a flexible cable 203. By utilizing the laser driver signal processor circuit 216 to process signals outputted by the PDIC 214 or the FMD on the optical pickup unit 204, the present invention is able to both reduce the number of signals needing to traverse the flexible cable 203 and reduce the sensitivity to distortion of signals that do traverse the flexible cable 203.

Within the laser driver signal processor circuit 216, the detected signal processing block 220 outputs read signals according to light received at the PDIC 214. In this embodiment, a sample and hold circuit 220 is used as the detected signal processing block 22 for sampling signals corresponding to light received by the PDIC 214 or the FMD and outputting read signals 226 according to the sampled signals. The read signal processing block 222 processes the read signals 226 and generates control signals and/or synthesis signals according to the read signals 226. The control unit 202 controls the optical pickup unit for recording and reproducing data. In one embodiment, a control signal 228 is used to control power of the laser driver circuit 218. In another embodiment, synthesis signals 230 are servo signals or wobble signals used by the control unit 202 to decode data recovered from the optical medium 224. Additionally, in yet another embodiment, both control signals 228 and synthesis signals 230 are used to control the power of the laser driver circuit 218 and to decode data recovered from the optical medium 224 by the control unit 202. These and other embodiments of the present invention are described in the following description.

Figure 3:
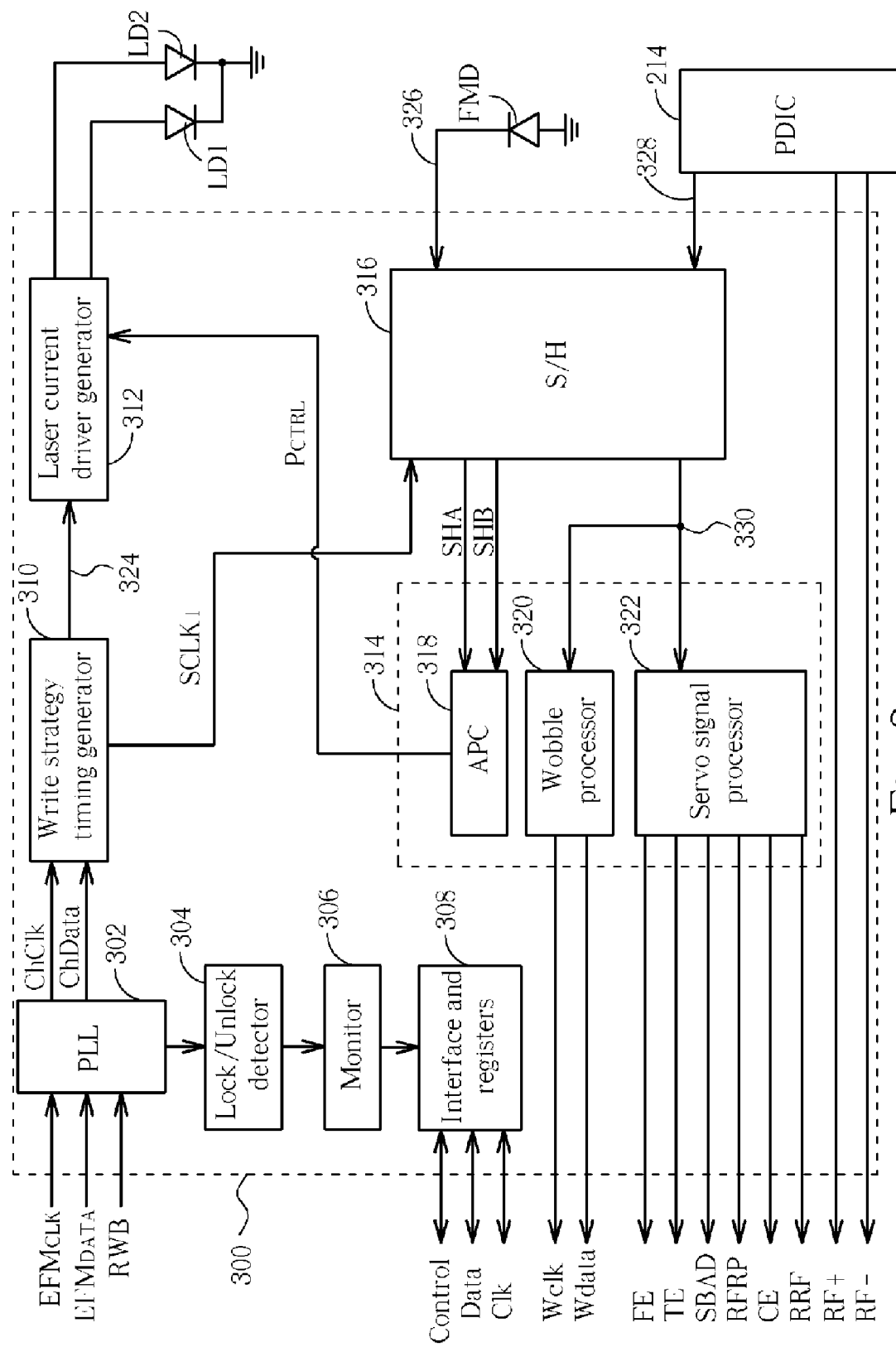
FIG. 3 shows a block diagram of a first laser driver signal processor circuit according to a first embodiment of the present invention.

FIG. 3 shows a block diagram of a first laser driver signal processor circuit 300 according to a first embodiment of the present invention. The first laser driver signal processor circuit 300 includes a phase lock loop (PLL) 302, a lock/unlock detector 304, a monitor signal generator 306, an interface circuit 308, a write strategy timing generator 310, laser current driver generation circuit 312, a read signal processing block 314, and a detected signal processing block 316 implemented as a sample and hold (S/H) circuit 316. In the first embodiment of the present invention, the read signal processing block 314 includes an automatic power control (APC) circuit 318, a wobble processing block 320, and a servo signal processor 322.

The control unit 202, shown in FIG. 2, utilizes the encode unit 210 to encode information to be recorded on the optical medium 224 to produce an eight to fourteen modulation (EFM) clock $EFM_{CLK}$ and an EFM data signal $EFM_{DATA}$, which are coupled to the optical pickup unit through the flexible cable 302. When the control unit 202 is utilizing the laser driver signal processor circuit 300 to record information on the optical medium 224 as indicated by a read/write signal RWB, the PLL 302 locks to the EFM clock and the EFM data signal and generates a corresponding channel clock ChClk and channel data signal ChData. The write strategy timing generator receives the channel clock ChClk and channel data signal ChData and generates corresponding write signals 324 according to a particular write strategy. The laser current driver generation circuit 312 converts the write signals 324 to laser diode drive signals for driving LD1 or LD2 according to a laser power control signal $P_{CTRL}$.

In this embodiment, signals 326 received from the front monitor diode (FMD) are sampled by the S/H circuit 316 under control of the write strategy timing generator circuit 310 using a first sample clock $SClk_1$. The APC circuit 318 generates the laser power control signal $P_{CTRL}$ to control a laser power of the laser diode according to sampled monitor signal SHA/SHB outputted by the sample and hold circuit. For example, SHA corresponds to the read power and SHB corresponds to the write power. In this way, power control of the laser diodes LD1 and LD2 is directly performed by the APC circuit 318 of the laser driver signal processor 300. Because no signals related to power control are outputted to the control unit 202, the number of signals carried by the flexible cable 203 is reduced. At high optical recording speeds, having the APC circuit 318 implemented within the laser driver signal processor 300 also prevents degradation of the automatic power control signal waveforms that would otherwise be caused by the flexible cable 203.

As shown in FIG. 3, the PDIC 214 detects light that was emitted by the laser diodes LD1 or LD2 and is reflected from the optical medium 224, and the PDIC outputs corresponding electrical signals 328. The S/H circuit 316 samples the electrical signals 328 and outputs sampled read signals 330. The laser driver signal processor 300 includes the servo signal processor 322, which generates servo synthesis signals (FE, TE, SBAD, RFRP, CE, RRF) according to sampled read signals 330. Additionally, the wobble processing block 320 generates synthesis signals being a wobble clock Wclk and a wobble data signal Wdata according to the read signals 330. The servo synthesis signals (FE, TE, SBAD, RFRP, CE, RRF), the wobble clock Wclk, and the wobble data signal Wdata are coupled to the control unit 202 via the flexible cable 203. In this way, the weak electrical signals 328 outputted by the PDIC 214 are not transmitted to the control unit 202 and do not need to traverse the flexible cable 203. By processing the electrical signals 328 in the laser driver signal processor circuit 300 that is installed on the optical pickup 204 to generate the servo and wobble synthesis signals (FE, TE, SBAD, RFRP, CE, RRF, Wclk, Wdata), there is no signal degradation of the electrical signals caused by sources such as cross-talk of the EFMCLK on the flexible cable 203.

The first embodiment of the present invention shown in FIG. 3 is not only limited to the read signal processing block 314 including the automatic power control (APC) circuit 318, the wobble processing block 320, and the servo signal processor 322. As will be easily understood by a person of ordinary skill in the art, any permutation of these functions can be performed by the read signal processing block 314 according to the present invention. In general, the present invention uses the detected signal processing block 314 for processing signals 328 or 326 corresponding to light received at a light detector (such as the FMD or the PDIC), and for outputting read signals 330, SHA, or SHB according to the signals 328 or 326. Afterwards, the read signal processing block 314 processes these read signals 330, SHA, or SHB to thereby generate corresponding control signals such as PCTRL or synthesis signals such as Wclk, Wdata, FE, TE, SBAD, RFRP, CE, or RRF.

In order to configure different aspects and parameters of the laser driver signal processor circuit 300, the laser driver signal processor circuit 300 further includes an interface circuit and registers 308. The interface circuit 308 is coupled to the control unit 202 via the flexible cable 203 and is a digital access port allowing the control unit 202 to transmit commands to, and receive information from, the laser driver signal processor circuit 300. The interface circuit 308 also includes a plurality of control registers for receiving the commands from the control unit 202 and for configuring parameters of the laser driver signal processor circuit 300. For example, the technology for controlling writing data to optical media, called the write strategy, is crucial for increasing the speed of optical recording operations to the optical medium 224. Currently, it is necessary to develop different write strategies for different types of optical media on the market. In this embodiment of the present invention, control of parameters related to the write strategy timing generator 310 is performed by the CPU 209 in the control unit 202 via the digital interface circuit 308. As will recognized by a person of ordinary skill in the art, other parameters of the laser driver signal processor circuit 300 can also be controlled by the control unit 202 using the interface circuit 308 in a similar manner.

Figure 4:
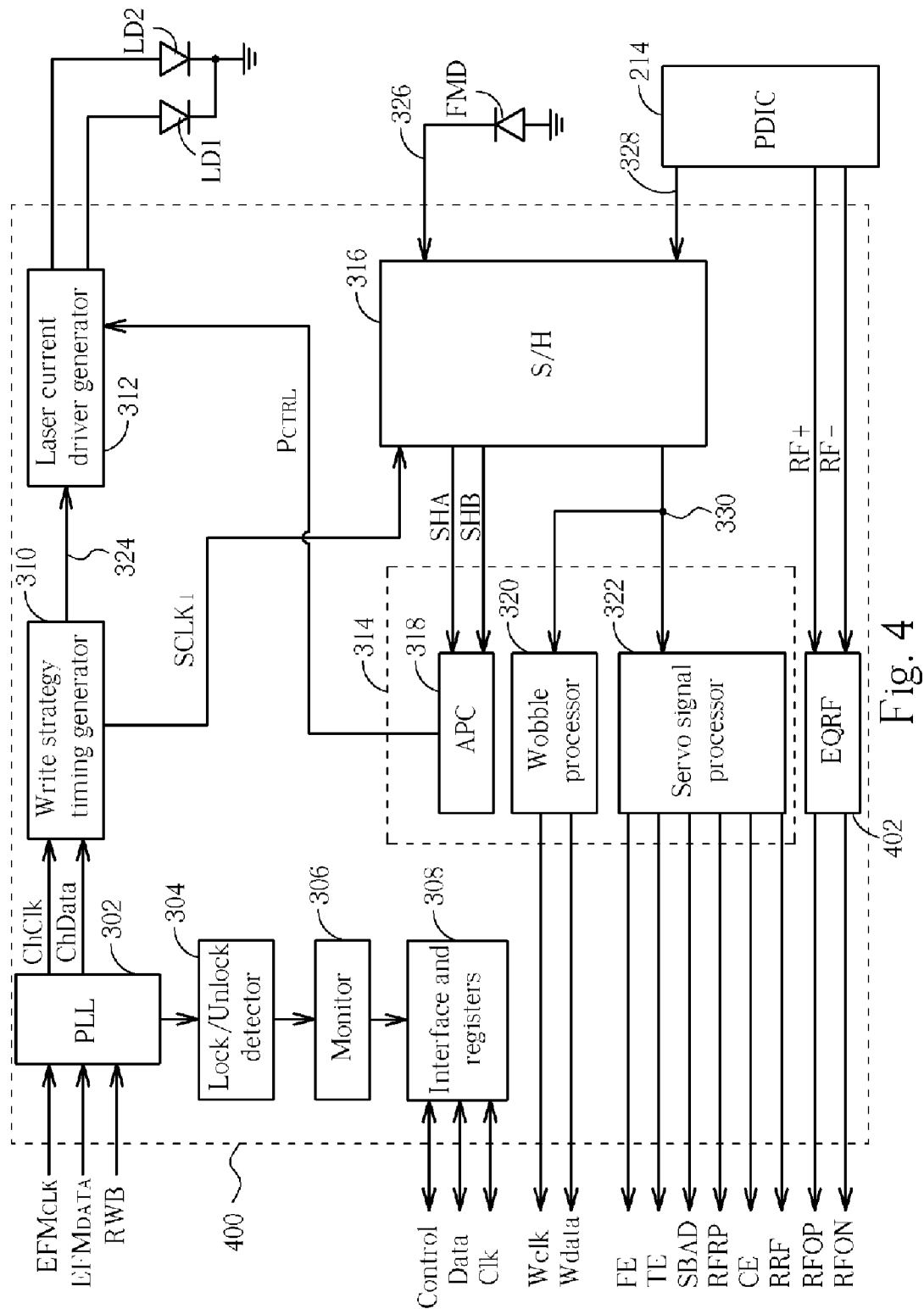
FIG. 4 is a block diagram of a second laser driver signal processor circuit according to a second embodiment of the present invention.

FIG. 4 is a block diagram of a second laser driver signal processor circuit 400 according to a second embodiment of the present invention. The second embodiment shown in FIG. 4 comprises the same components connected in the same manner as the first embodiment shown in FIG. 3; however, the second laser driver signal processor circuit 400 shown in FIG. 4 additionally includes an RF equalizer 402. The RF equalizer 402 reshapes and amplifies the positive receive signal RF+ and the negative receive signal RF− outputted by the PDIC 214 to generate amplified positive and negative receive signals RFOP, RFON. In this way, the positive and negative receive signals RF+, RF−, which are highly sensitive to cross-talk and interference, are not transmitted to the control unit 202 via the flexible cable 203. Instead, they are first reshaped and amplified to form the more robust amplified positive and negative receive signals RFOP, RFON for transmission across the flexible cable 203. In this way, the present invention reduces the sensitivity to distortion of signals that do need to traverse the flexible cable 203.

Figure 5:
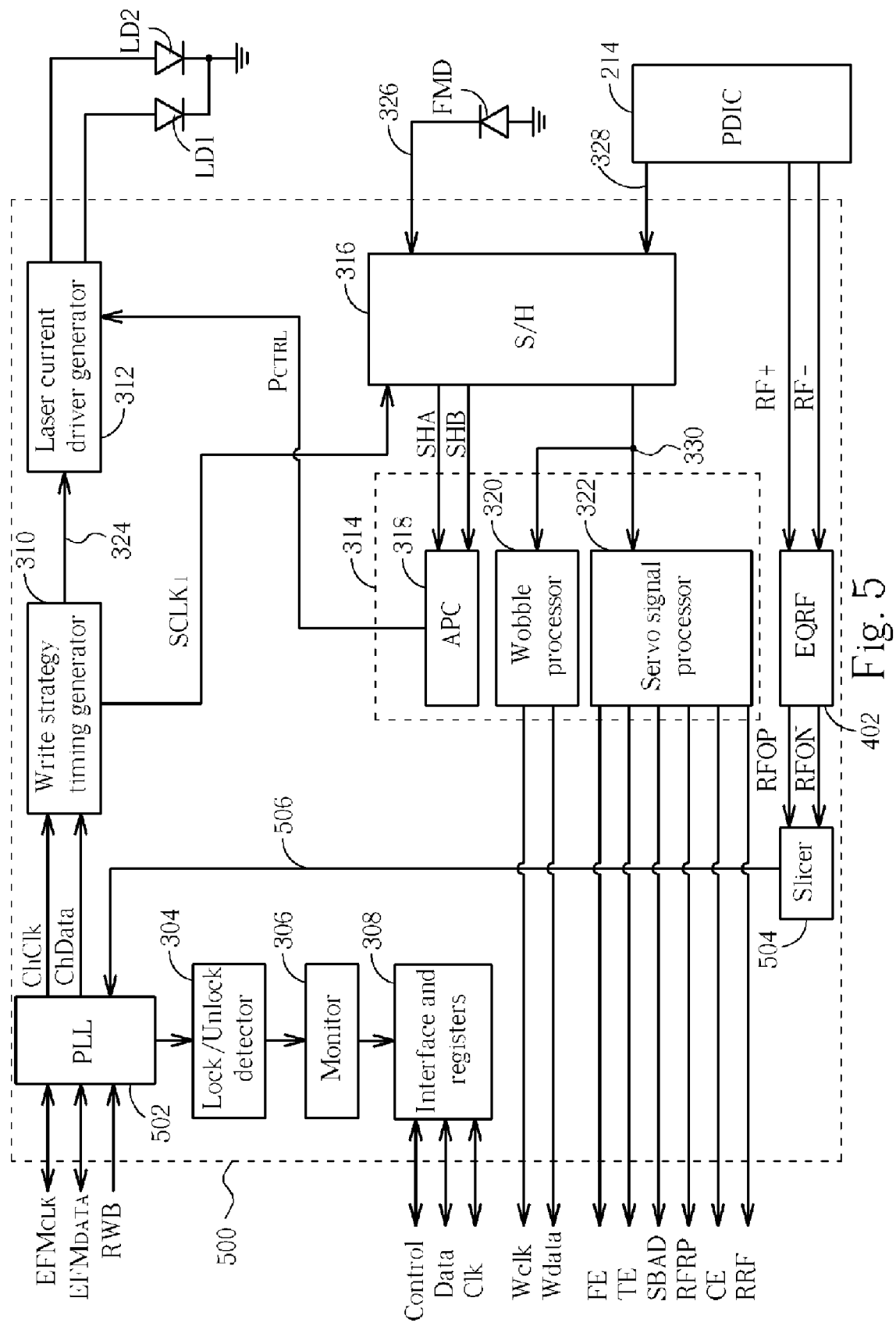
FIG. 5 is a block diagram of a third laser driver signal processor circuit according to a third embodiment of the present invention.

FIG. 5 is a block diagram of a third laser driver signal processor circuit 500 according to a third embodiment of the present invention. The third embodiment shown in FIG. 5 comprises similar components connected in a similar manner as the second embodiment shown in FIG. 4; however, the third laser driver signal processor circuit 500 shown in FIG. 5 includes a modified PLL circuit 502, and a slicer 504. The amplified positive and negative receive signals RFOP, RFON outputted by the equalizer 402 are input to the slicer 504. The slicer 504 acts similar to a comparator and converts the analog positive and negative receive signals RFOP, RFON to digital signals 506. These digital signals 506 are coupled to the PLL circuit 502. The PLL 502 locks to the digital signals 506 and generates corresponding $EFM_{CLK}$ and $EFM_{DATA}$ signals for transmission to the control unit 202. In the previous embodiments, the PLL 302 was only used when the laser driver signal processor circuit 300, 400 was being utilized to record information on the optical medium 224 as indicated by the read/write signal RWB. In this embodiment, the PLL 502 is utilized both when recording data to the optical medium 214 and when reproducing data from the optical medium 214. The read/write signal RWB specifies whether the $EFM_{CLK}$ and $EFM_{DATA}$ signal lines of the PLL 502 are to be configured as inputs or outputs. By using the $EFM_{CLK}$ and $EFM_{DATA}$ signal lines as both inputs and outputs, in this embodiment, the number of signals needing to be coupled between the control unit 202 and the optical pickup 204 on the flexible cable 203 is further reduced. Additionally, circuit components such as the generation of the $EFM_{CLK}$ and $EFM_{DATA}$ corresponding to the recovered data in the decoder 212 of the control unit 202 are reduced.

Figure 6:
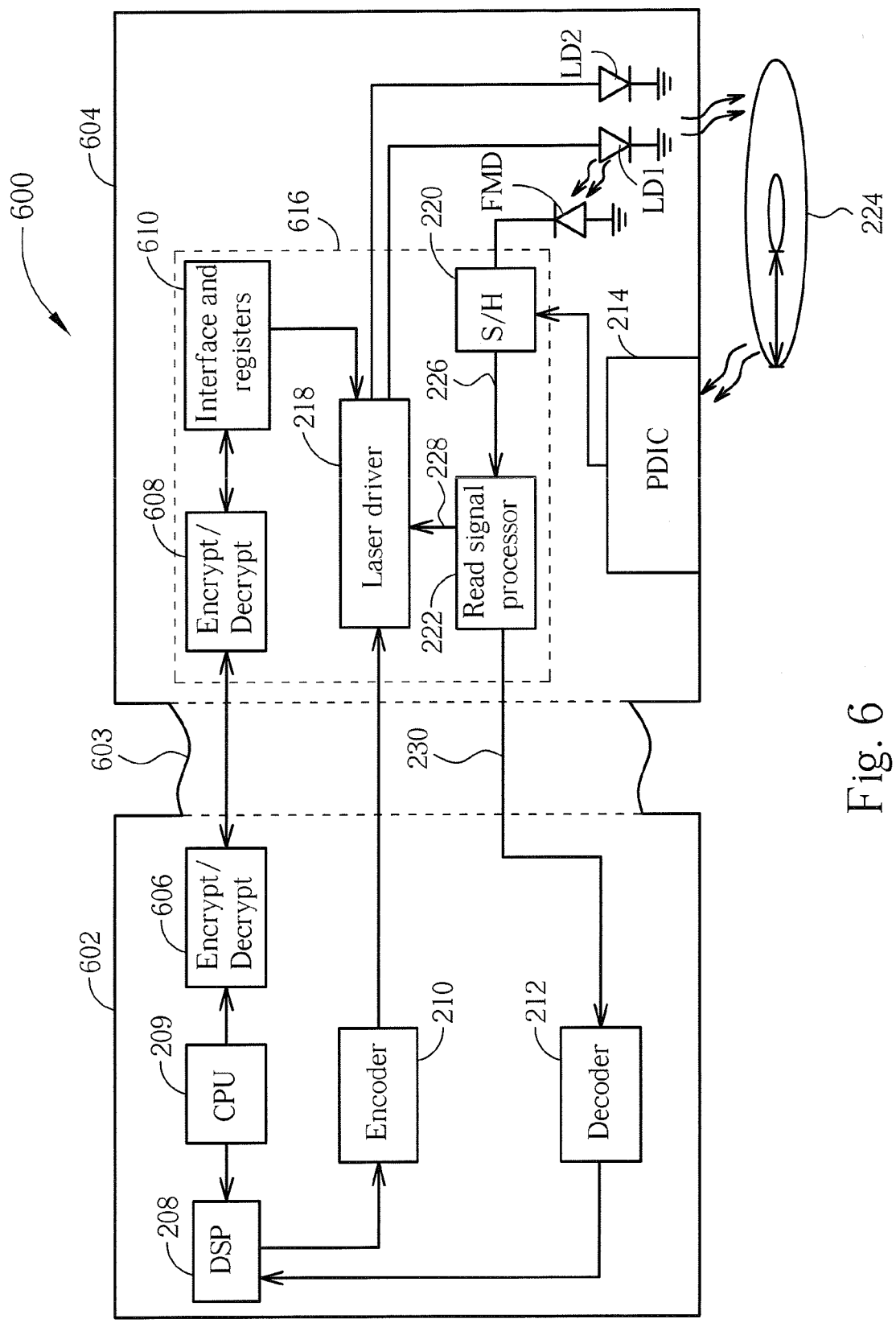
FIG. 6 is an overall block diagram of an optical storage system according to another embodiment of the present invention.

FIG. 6 is an overall block diagram of an optical storage system 600 according to another embodiment of the present invention. The optical storage system 600 includes a control unit 602 and an optical pickup unit 604. Similar to the previous embodiments, the optical pickup unit 604 is movable across the optical medium 224 and is connected to the control unit 602 via the flexible cable 603. However, in addition to the same components as shown in FIG. 2, the control unit 602 further includes a first encryption/decryption module 606, and the optical pickup unit 604 further includes a second encryption/decryption module 608 and an interface circuit 610. The interface circuit 610 operates similar to as previously described; however, in this embodiment, the commands and information sent between the control unit 602 and the laser driver signal processor circuit 616 through the interface circuit 610 are encrypted. The reason for encrypting the control commands and information passed through the interface circuit 610 is to prevent the use of test equipment (such as a logic analyzer) from being used to reverse engineer the operation of the laser driver signal processor circuit 616. For example, the encryption/decryption units 606, 608 can be used in order to prevent others from determining specific details regarding a particular write strategy of the laser driver signal processor circuit 616. It should also be noted that the encryption/decryption units 606, 608 could also be replaced with (or used in combination with) error detection modules for detecting (and correcting) errors in the commands or information sent between the control unit 602 and the laser driver signal processor circuit 616 through the interface circuit 610.

Figure 7:
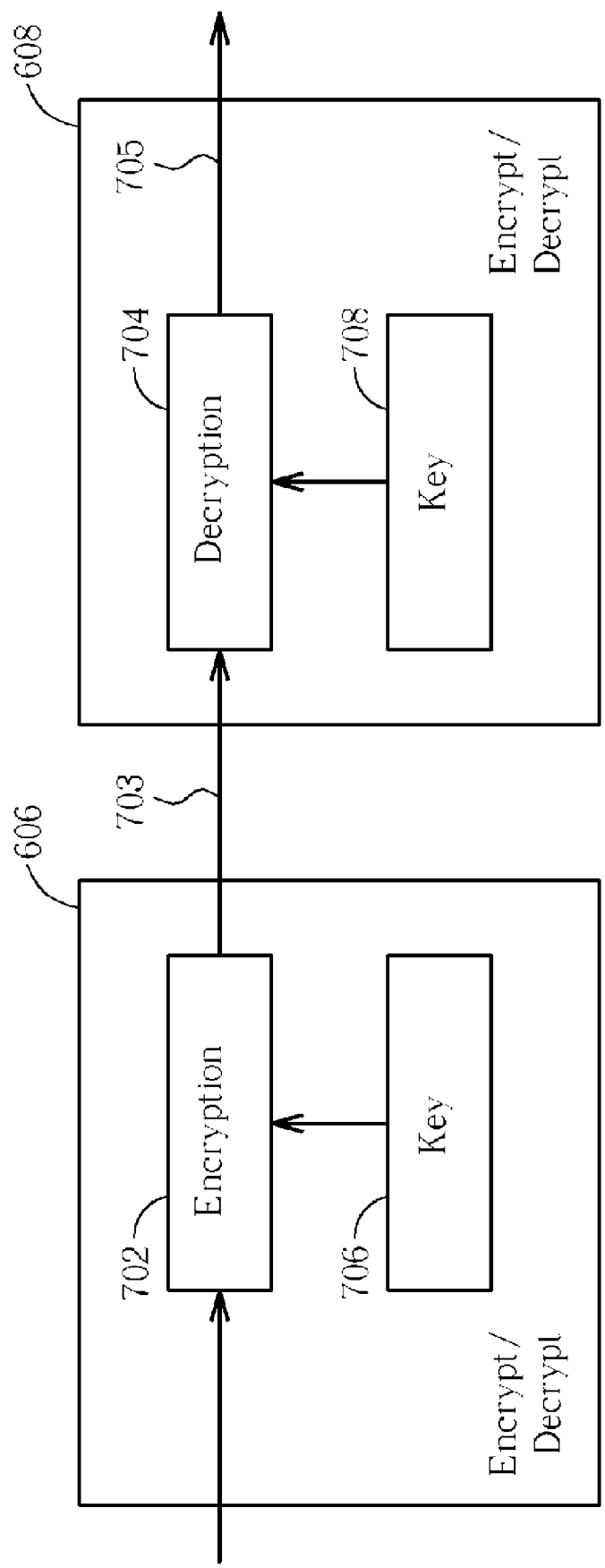
FIG. 7 is an example block diagram showing symmetric encryption/decryption units of FIG. 6.

FIG. 7 shows an example of symmetric encryption/decryption units 606, 608. Commands and information sent from the control unit 602 to the optical pickup unit 604 are encrypted by the first encryption/decryption module 606, and are decrypted by the second encryption/decryption module 608. During the data transfer process, the first encryption/decryption module 606 uses a first key 706 to perform encryption with an encryption module 702. Afterwards, encrypted information 703 is sent to the second encryption/decryption module 608. When the second encryption/decryption module 608 receives the encrypted information 703, a second key 708 is used to perform decryption with a decryption module 704. Afterwards, clear-text information 705 is passed to the interface circuit 610. Because a symmetric encryption/decryption mechanism is used in this example, the first key 706 and the second key 708 must be the same.

Figure 8:
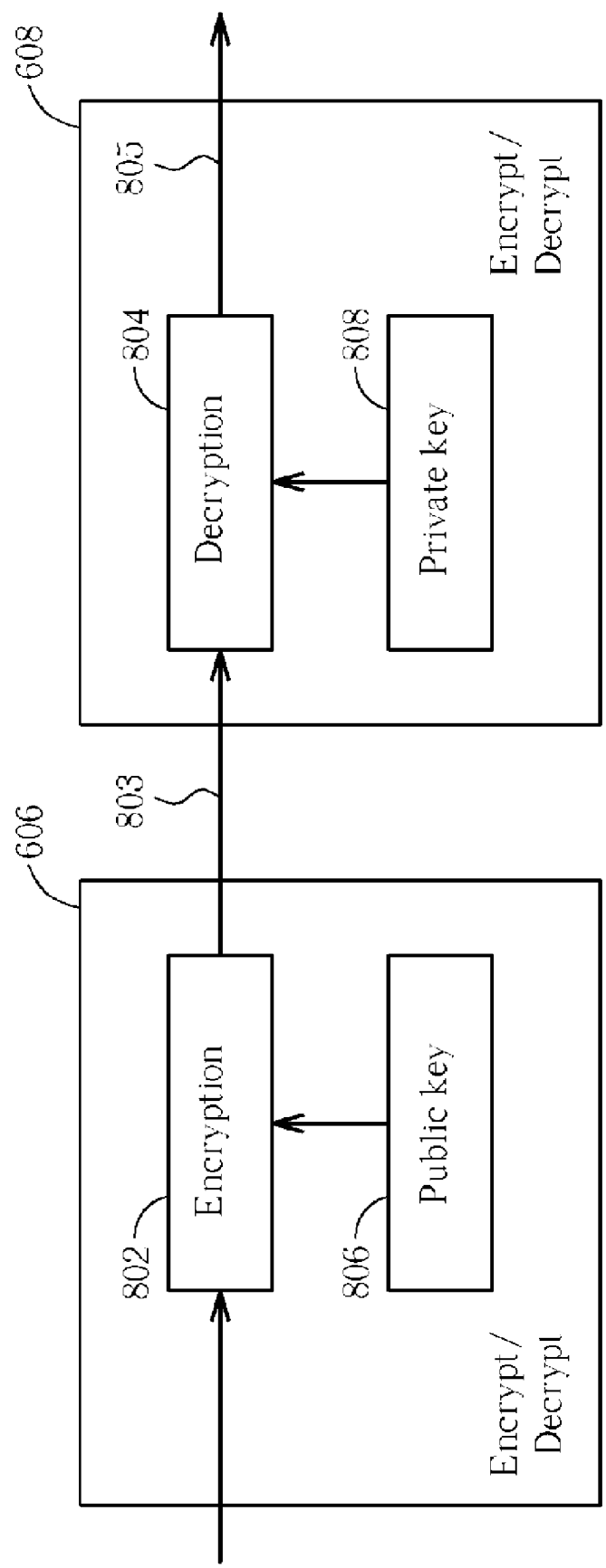
FIG. 8 is an example block diagram showing asymmetric encryption/decryption units of FIG. 6.

FIG. 8 is another example of asymmetric encryption/decryption units 606, 608. Commands and information sent from the control unit 602 to the optical pickup unit 604 are encrypted by the first encryption/decryption module 606, and are decrypted by the second encryption/decryption module 608. During the data transfer process, the first encryption/decryption module 606 uses a public key 806 to perform encryption with an encryption module 802. Afterwards, encrypted information 803 is sent to the second encryption/decryption module 608. When the second encryption/decryption module 608 receives the encrypted information 803, a private key 808 is used to perform decryption with a decryption module 804. Afterwards, clear-text information 805 is passed to the interface circuit 610. Because an asymmetric encryption/decryption mechanism is used in this example, the public key 806 and the private key 808 together form a pair. That is, there is a mathematical relationship between the private key 806 and the public key 808. Therefore, before receiving encrypted data from the first encryption/decryption module 606, the second encryption/decryption module 608 must inform the first encryption/decryption module 606 of which private key 808 will be used. Then the first encryption/decryption module 606 will encrypt the commands and information using a corresponding public key 806.

Figure 9:
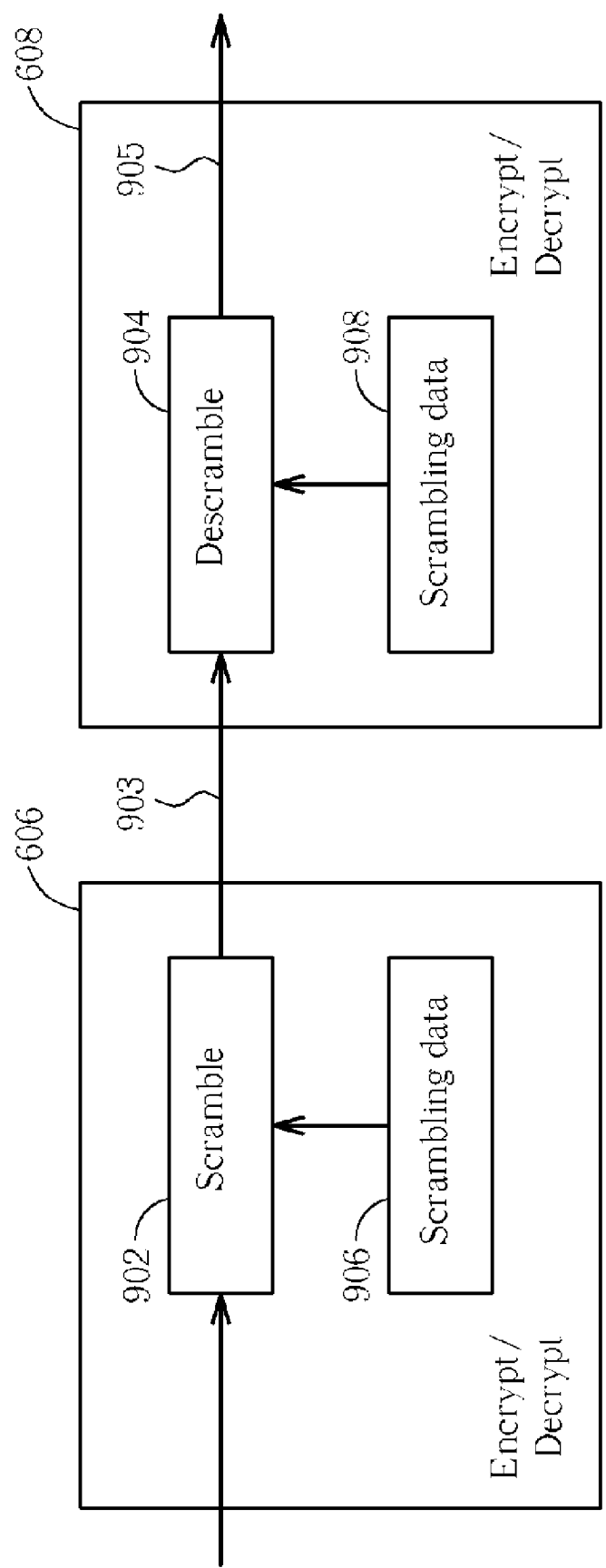
FIG. 9 is a third example block diagram of the encryption/decryption units of FIG. 6.

FIG. 9 shows a third example of encryption/decryption units 606, 608. The commands and information sent from the control unit 602 to the optical pickup unit 604 are scrambled by the first encryption/decryption module 606, and are descrambled by the second encryption/decryption module 608. During the data transfer process, the first encryption/decryption module 606 uses scrambling data 906 to perform a scrambling operation with a scrambling module 902. Afterwards, scrambled information 903 is sent to the second encryption/decryption module 608. When the second encryption/decryption module 608 receives the scrambled data 903, scrambling data 908 is used to perform a descrambling operation with a descrambling module 904. Afterwards, clear-text information 905 is passed to the interface circuit 610. In this example, the scrambling/descrambling operations refer to performing an exclusive-OR logical operation (XOR) on scrambled or scrambled data using scrambling data 906, 908 to obtain scrambled or clear-text data, respectively. Therefore, before starting the data transfer, the scrambling data 906 and 908 must consist of the same initial preset value. The scrambling data 906 and 908 can be implemented using a feedback shift register.

The present invention discloses an optical storage system having a laser driver signal processor circuit installed on an optical pickup unit. By utilizing the laser driver signal processor circuit to process signals outputted by a PDIC or an FMD on the optical pickup unit itself, the present invention is able to both reduce the number of signals needing to traverse a flexible cable connecting the optical pickup unit to a control unit, and to reduce the sensitivity to distortion of signals that do traverse the flexible cable. The laser driver signal processor circuit can process signals outputted by the FMD in order to generate control signals for controlling the output power of the laser diodes of the optical pickup unit. The laser driver signal processor circuit can also process signals outputted by the PDIC to generate synthesis signals (e.g., servo signals or wobble signals) for decoding data recovered from an optical medium. An RF equalizer is disclosed by the present invention and reshapes and amplifies a positive receive signal RF+ and a negative receive signal RF− outputted by the PDIC. In this way, the positive and negative receive signals RF+, RF−, which are highly sensitive to cross-talk and interference, are not transmitted to the control unit via the flexible cable. A slicer can be used in the laser driver signal processor circuit to convert the output of RF equalizer to digital signals and allow the reuse of a PLL both when recording data to the optical medium and when reproducing data from the optical medium. Encryption and decryption modules can be used in the control unit and the laser driver signal processor circuit to encrypt commands and information sent between the control unit and the laser driver signal processor circuit. In this way, reverse engineering the operation of the laser driver signal processor circuit by using test equipment (such as a logic analyzer) attached to the flexible cable is prevented. Additionally, according to the present invention, error checking can be performed on the commands sent across the flexible cable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical storage system comprising:
an optical pickup unit movable across an optical medium, the optical pickup unit comprising a light detector, a laser diode, and a laser driver signal processor circuit comprising:
   a detected signal processing block for outputting read signals corresponding to light received at the light detector; and
   a read signal processing block for processing the read signals and generating control signals or synthesis signals according to the read signals; and
a control unit being coupled to the optical pickup unit for controlling the optical pickup unit and decoding data recovered from the optical medium;
wherein the laser driver signal processor circuit further comprises an interface circuit coupled to the control unit; the interface circuit has a plurality of control registers for receiving commands from the control unit and for configuring the laser driver signal processor circuit according to the received commands; and the laser driver signal processor circuit and the control unit further comprise encryption/decryption modules for respectively encrypting or decrypting the commands and information sent between the control unit and the laser driver signal processor circuit through the interface circuit.

2. An optical storage system comprising:
an optical pickup unit movable across an optical medium, the optical pickup unit comprising a light detector, a laser diode, and a laser driver signal processor circuit comprising:
   a detected signal processing block for outputting read signals corresponding to light received at the light detector; and
   a read signal processing block for processing the read signals and generating control signals or synthesis signals according to the read signals; and
a control unit being coupled to the optical pickup unit for controlling the optical pickup unit and decoding data recovered from the optical medium;
wherein the laser driver signal processor circuit further comprises an interface circuit coupled to the control unit; the interface circuit has a plurality of control registers for receiving commands from the control unit and for configuring the laser driver signal processor circuit according to the received commands; and the laser driver signal processor circuit and the control unit further comprise error detection modules for detecting errors or correcting errors in the commands or information sent between the control unit and the laser driver signal processor circuit through the interface circuit.

3. A laser driver signal processor circuit installed in a movable optical pickup unit of an optical storage device, the laser driver signal processor circuit comprising:
a detected signal processing block for outputting read signals corresponding to light received at the light detector;
a read signal processing block for processing the read signals and generating control signals or synthesis signals according to the read signals;
an interface circuit, coupled to a control unit, comprising:
   a plurality of control registers for receiving commands from the control unit and for configuring the laser driver signal processor circuit according to the received commands; and
   an encryption/decryption module, for encrypting or decrypting the commands and other information sent between the control unit and the laser driver signal processor circuit through the interface circuit.

4. A laser driver signal processor circuit installed in a movable optical pickup unit of an optical storage device, the laser driver signal processor circuit comprising:
a detected signal processing block for outputting read signals corresponding to light received at the light detector;
a read signal processing block for processing the read signals and generating control signals or synthesis signals according to the read signals;
an interface circuit, coupled to a control unit, comprising:
   a plurality of control registers for receiving commands from the control unit and for configuring the laser driver signal processor circuit according to the received commands; and
   an error detection module for detecting errors in the commands or other information sent between the control unit and the laser driver signal processor circuit through the interface circuit.

* * * * *